United States Patent
Wang et al.

(10) Patent No.: US 12,223,560 B2
(45) Date of Patent: Feb. 11, 2025

(54) CLOCK ARCHITECTURE AND METHOD SUPPORTING PCIE CLOCK, AND MEDIUM

(71) Applicant: SUZHOU METABRAIN INTELLIGENT TECHNOLOGY CO., LTD., Jiangsu (CN)

(72) Inventors: Haibo Wang, Jiangsu (CN); Zhihua Ge, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/570,597

(22) PCT Filed: Jun. 7, 2022

(86) PCT No.: PCT/CN2022/097425
§ 371 (c)(1),
(2) Date: Dec. 14, 2023

(87) PCT Pub. No.: WO2023/115834
PCT Pub. Date: Jun. 29, 2023

(65) Prior Publication Data
US 2024/0273668 A1 Aug. 15, 2024

(30) Foreign Application Priority Data
Dec. 23, 2021 (CN) .......................... 202111585044.1

(51) Int. Cl.
*G06T 1/20* (2006.01)
*G06F 13/40* (2006.01)
*G06F 13/42* (2006.01)

(52) U.S. Cl.
CPC ............ *G06T 1/20* (2013.01); *G06F 13/4022* (2013.01); *G06F 13/4291* (2013.01); *G06F 2213/0026* (2013.01)

(58) Field of Classification Search
CPC .................. G06T 1/20; G06F 13/4022; G06F 13/4291; G06F 2213/0026
See application file for complete search history.

(56) References Cited

U.S. PATENT DOCUMENTS 10,871,796 B1    12/2020  Gaide et al.
2017/0270245 A1*  9/2017  van Rooyen .......... G16B 50/40
(Continued)

FOREIGN PATENT DOCUMENTS

CN    108259108 A      7/2018
CN    209803659 U  *  12/2019
(Continued)

*Primary Examiner* — Sing-Wai Wu
*Assistant Examiner* — Khoa Vu
(74) *Attorney, Agent, or Firm* — IPro, PLLC

(57) ABSTRACT

A clock architecture supporting a PCIE clock, including a controller, a GPU, a PCIE switch, a FPGA, a first clock generator, a second clock generator, a first clock fan-out device and a second clock fan-out device; the first clock generator is configured to generate a 100 MHz homologous clock signal; the second clock generator is configured to generate a 100 MHz non-homologous clock signal; the FPGA is connected to the PCIE switch and the GPU, and configured to read clock architecture modes supported by the PCIE switch and the GPU, acquire corresponding 100 MHz clock signals according to the clock architecture modes, and fan out the acquired 100 MHz clock signals to the PCIE switch and the GPU to be used, the clock architecture modes are a homologous mode and a non-homologous mode.

17 Claims, 2 Drawing Sheets

(56) References Cited

U.S. PATENT DOCUMENTS

| | | | | |
|---|---|---|---|---|
| 2017/0308499 | A1* | 10/2017 | Sardaryan | G06F 13/4282 |
| 2022/0043475 | A1* | 2/2022 | Iyengar | H03K 19/1737 |
| 2022/0092003 | A1* | 3/2022 | Aharony | G06F 1/20 |
| 2022/0309017 | A1* | 9/2022 | Cai | G06F 13/4022 |
| 2023/0388209 | A1* | 11/2023 | Li | G06F 13/4282 |

FOREIGN PATENT DOCUMENTS

| | | |
|---|---|---|
| CN | 111427809 A | 7/2020 |
| CN | 112291027 A | 1/2021 |
| CN | 112463697 A | 3/2021 |
| CN | 113406991 A | 9/2021 |
| CN | 113986795 A | 1/2022 |

\* cited by examiner

CLOCK ARCHITECTURE AND METHOD SUPPORTING PCIE CLOCK, AND MEDIUM

CROSS-REFERENCE TO RELATED APPLICATION

The present application claims priority to Chinese patent application No. 202111585044.1 entitled "CLOCK ARCHITECTURE AND METHOD SUPPORTING PCIE CLOCK, AND MEDIUM", filed on Dec. 23, 2021 before the China National Intellectual Property Administration, which is incorporated herein in its entirety by reference.

TECHNICAL FIELD

The present application relates to the field of system design and, more particularly, to a clock architecture and method supporting a PCIE clock, and a medium.

BACKGROUND

With the generation of the expansive domestic application market and the massive amounts of data, on the basis of the development of big data, cloud computing and artificial intelligence, if the central processing unit (CPU) is simply allowed to process massive data, on the one hand, the computing power of the CPU is limited: on the other hand, the load of the CPU may be increased, and then other major services running on the CPU may be affected. On this basis, various accelerating technologies come into being. The mainstream accelerating technologies in the market include a graphics processing unit (GPU) accelerating technology, a field-programmable gate array (FPGA) accelerating card accelerating technology, and an intelligent network card accelerating technology. These three accelerating cards are all programmable communication interface extension (PCIE) devices, and the three devices support both of the homologous and the non-homologous clock architecture of the PCIE clock. Assuming the PCIE timing sequence and jitter are met, mainstream manufacturers may select one of the clock architectures for product design.

SUMMARY

The present disclosure provides a clock architecture supporting a PCIE clock, including: a controller, a graphics processing unit (GPU), a programmable communication interface extension (PCIE) switch, a field-programmable gate array (FPGA), a first clock generator, a second clock generator, a first clock fan-out device and a second clock fan-out device:
the first clock generator is connected to the first clock fan-out device, and is configured to generate a 100 MHz homologous clock signal: the first clock fan-out device is connected to the controller and the FPGA, and is configured to fan out the 100 MHz homologous clock signal; and
the second clock generator is connected to the second clock fan-out device, and is configured to generate a 100 MHz non-homologous clock signal: the second clock fan-out device is connected to the FPGA, and is configured to fan out the 100 MHz non-homologous clock signal: the controller is connected to the PCIE switch, the PCIE switch is connected to the GPU: the FPGA is connected to the PCIE switch and the GPU, and is configured to read the clock architecture modes supported by the PCIE switch and the GPU, acquire corresponding 100 MHZ clock signals according to the clock architecture modes, and fan out the acquired 100 MHz clock signals to the PCIE switch and the GPU to be used, where the clock architecture modes are a homologous mode and a non-homologous mode.

In some embodiments, the clock architecture further includes a power supply:
the FPGA is connected to the power supply, and is configured to transmit an enabling signal; and
the power supply is connected to the GPU and the PCIE switch, and is configured to receive the enabling signal to supply power to the GPU and the PCIE switch.

The present disclosure provides a method for supporting a PCIE clock. The method is based on the clock architecture supporting the PCIE clock stated above, and includes:
reading the clock architecture modes supported by the PCIE switch and the GPU, and the clock architecture modes are the homologous mode and the non-homologous mode;
acquiring corresponding 100 MHz clock signals according to the clock architecture modes, and the 100 MHz clock signals are the 100 MHz homologous clock signal and the 100 MHz non-homologous clock signal; and
transmitting the acquired 100 MHz clock signals correspondingly to the PCIE switch and the GPU to be used.

In some embodiments, the acquiring corresponding 100 MHz clock signals according to the clock architecture modes includes:
acquiring the 100 MHz homologous clock signals when the read clock architecture modes supported by the PCIE switch and the GPU are both the homologous mode;
acquiring the 100 MHz non-homologous clock signal when the read clock architecture modes supported by the PCIE switch and the GPU are both the non-homologous mode; and
acquiring the 100 MHz homologous clock signal and the 100 MHz non-homologous clock signal when the read clock architecture mode supported by the PCIE switch is the homologous mode and the read clock architecture mode supported by the GPU is the non-homologous mode.

In some embodiments, the reading the clock architecture modes supported by the PCIE switch and the GPU includes:
reading the clock architecture modes supported by the PCIE switch and the GPU via a system management bus (SMBUS) link.

In some embodiments, the method further includes:
performing a test on testing signals of the 100 MHz homologous clock signal and the 100 MHz non-homologous clock signal after acquiring a loopback board; and
performing, according to a phase difference between the testing signals and practical signals, compensation to suppress the phase difference, the practical signals are the 100 MHz clock signal actually transmitted to the PCIE switch and the GPU.

In some embodiments, the reading the clock architecture modes supported by the PCIE switch and the GPU includes:
reading the clock architecture modes supported by the PCIE switch and the GPU when the PCIE switch and the GPU are powered on successfully.

The present disclosure provides a clock architecture supporting a PCIE clock, based on the clock architecture supporting the PCIE clock stated above, the clock architecture supporting the PCIE clock includes:

a reading module, configured to read clock architecture modes supported by a PCIE switch and a GPU, the clock architecture modes are a homologous mode and a non-homologous mode;

an acquisition module, configured to acquire corresponding 100 MHz clock signals according to the clock architecture modes, the 100 MHz clock signals are a 100 MHz homologous clock signal and a 100 MHz non-homologous clock signal; and a transmission module, configured to transmit the acquired 100 MHZ clock signals correspondingly to the PCIE switch and the GPU to be used.

Embodiments of the present disclosure further provide a clock architecture supporting a PCIE clock, including a memory and one or more processors. The memory is stored with computer-readable instructions that, when executed by the one or more processors, cause the one or more processors to implement the steps of the method for supporting the PCIE clock according to any one of the embodiments stated above.

Finally, embodiments of the present disclosure further provide one or more non-volatile computer-readable storage mediums storing computer-readable instructions. The computer-readable instructions, when executed by one or more processors, cause the one or more processors to implement the steps of the method for supporting the PCIE clock stated above.

BRIEF DESCRIPTION OF THE DRAWINGS

In order to more clearly explain the embodiments of the present disclosure, the accompanying drawings required to be used in the embodiments are briefly introduced below. Apparently, the drawings in the description below are merely some embodiments of the present disclosure, and those skilled in the art may obtain other drawings according to these drawings without involving creative effort.

DETAILED DESCRIPTION

The technical solutions of the embodiments of the present disclosure are clearly and completely described below in combination with the accompanying drawings in the embodiments of the present disclosure. Apparently, the embodiments described are only a part of the embodiments of the present disclosure, rather than all the embodiments. Based on the embodiments in the present disclosure, all other embodiments acquired by those skilled in the art without involving creative effort shall fall within the scope of the present disclosure.

With the trend of localization and the development of corresponding domestic chip technology, more and more domestic accelerating chips and corresponding accelerating cards have emerged. The domestic accelerating cards only support one of the homologous clock architecture and the non-homologous clock architecture. Thus, domestic accelerating cards have great limitations. It is necessary to manufacture two cards to adapt to different GPUs or other accelerating devices, and then to meet the two clock architectures by the compatibility of the brower object model switch (BOM Switch) or other methods. One card adapts to and supports the homologous clock architecture, and the other card adapts to and supports the non-homologous clock architecture. Additional compatible devices are needed to achieve better compatibility. When the clock architecture mode of the GPU is different from the clock architecture modes supported by other accelerating devices, the two cards cannot be adapted at the same time. The two cards occupy a larger space of the main board, the development cost for hardware connection and the equipment cost are increased.

Therefore, how to improve and support the compatibility of clock architectures is an urgent problem needed to be solved by those skilled in the art.

The core of the present disclosure is to provide a clock architecture and method supporting a PCIE clock, and a medium, that can improve the compatibility of the clock architecture supporting the PCIE clock.

In order to ensure those skilled in the art to better understand the solution of the present disclosure, the present disclosure will be further described in detail in combination with the accompanying drawings and the embodiments below.

It should be noted that the clock architecture supporting the PCIE clock provided by the present disclosure is only provided for the accelerating components of the PCIE device. The PCIE device includes accelerating cards of a chip, GPUs or intelligent network cards and so on. The clock architecture supports the accelerating cards of the foreign servers and the domestic servers. Depending on the actual situation, the clock architecture is set according to the hard-wired connection mode of different server vendors, which is not specifically defined by the present disclosure, and only the clock architecture supporting the PCIE clock is provided.

Figure 1:
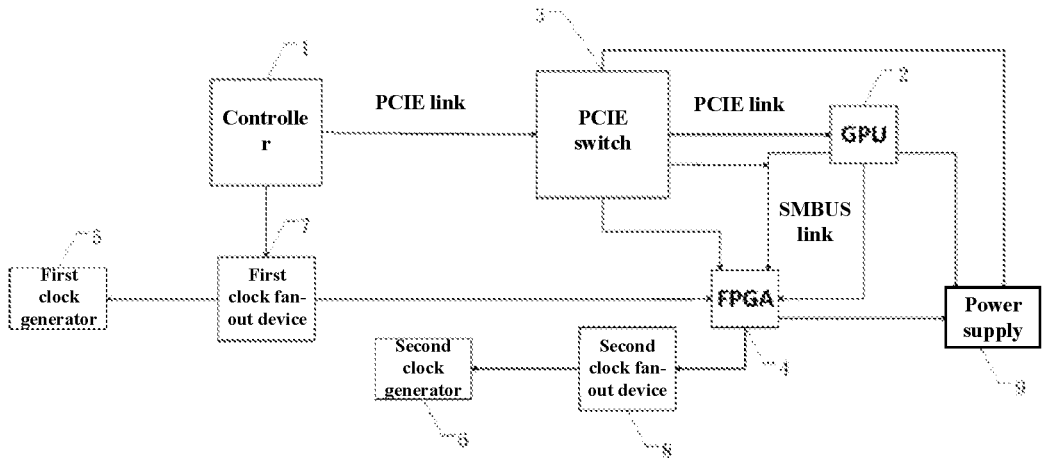
FIG. 1 is a structural diagram of a clock architecture supporting a PCIE clock according to one or more embodiments of the present disclosure.

FIG. 1 is a structural diagram of a clock architecture supporting a PCIE clock according to an embodiment of the present disclosure. As shown in FIG. 1, the present disclosure provides a clock architecture supporting the PCIE clock, including: a controller 1, a GPU 2, a PCIE switch 3, a FPGA 4, a first clock generator 5, a second clock generator 6, a first clock fan-out device 7 and a second clock fan-out device 8.

The first clock generator 5 is connected to the first clock fan-out device 7, and is configured to generate a 100 MHz homologous clock signal. The first clock fan-out device 7 is connected to the controller 1 and the FPGA 4, and is configured to fan out the 100 MHZ homologous clock signal.

The second clock generator 6 is connected to the second clock fan-out device 8, and is configured to generate a 100 MHz non-homologous clock signal. The second clock fan-out device 8 is connected to the FPGA 4, and is configured to fan out the 100 MHz non-homologous clock signal. The controller 1 is connected to the PCIE switch 3, the PCIE switch 3 is connected to the GPU 2. The FPGA 4 is connected to the PCIE switch 3 and the GPU 2, and is configured to read the clock architecture modes supported by the PCIE switch 3 and the GPU 2, acquire corresponding 100 MHZ clock signals according to the clock architecture modes, and fan out the 100 MHz clock signals to the PCIE switch 3 and the GPU 2 to be used, and the clock architecture modes are a homologous mode and a non-homologous mode.

Each chip in a circuit requires an external clock input. However, the controller 1, a universal serial bus (USB), a hard disk interface and the accelerating card have significantly different requirements for the clock frequency and the bandwidth. In some designs, a crystal oscillator of each chip is served as a clock source. In some designs, the crystal oscillator is served as a clock source, and then a clock signal is generated by the clock generator and provided to various chips. The clock oscillation source only provides one kind of frequency, and the motherboard manufacturer integrates scattered oscillation circuits into a "frequency synthesizer" chip. The clock generator continuously generates voltage pulses with stable intervals. All components may perform operations synchronously according to the clock. The phase-locked loop is the core technology of the clock generator. More than one phase-locked loop and frequency dividers with different proportions are used to generate clock outputs with various frequencies.

It should be noted that the first clock generator 5 and the second clock generator 6 may have the same or different models and specific design circuits, and the difference between the first clock generator 5 and the second clock generator 6 mainly lies in the connection mode. The first clock generator 5 is connected to the first clock fan-out device 7, and then connected to the controller 1 and the FPGA 4. The second clock generator 6 is connected to the second clock fan-out device 8 and then connected to the FPGA 4 stated above. The first clock generator 5 connected to the controller 1 output the homologous clock signal. The second clock generator 6, that is not connected to the controller 1 and directly connected to the FPGA 4, output the non-homologous clock signal.

The first clock fan-out device 7 and the second clock fan-out device 8 follow the same principle as the first clock generator 5 and the second clock generator 6 mentioned above, and their connection modes are not described. The clock fan-out device is to ensure the phases of the clock reaching the trigger to be the same, achieve the synchronization function by adjusting the delay, additionally, increasing the driving ability. If the clock fan-out device is close to the clock source, it is impossible to drive more triggers.

A 100 MHz clock signal is output no matter whether it is a homologous clock signal or a non-homologous clock signal. The line rate of the PCIE is generally 5 Gb/s and 2.5 Gb/s. The reference clock may be of 100 MHZ, 125 MHZ and 250 MHZ, or may be 200 MHZ. For the accelerating card, the reference clock is 100 MHZ clock signal. The actions of most devices in the system are carried out on the jump edge of the clock, and the time delay difference of the clock signal needs to be small. Moreover, the clock signal is usually a signal with a highest frequency and the heaviest load in the system. Therefore, based on such consideration, it is generally provided, in programmable devices such as FPGA 4, with certain amounts of global clock networks that are specially used for the system clock driving, thus improving the reliability of the system.

The PCIE switch 3 has a very low on-capacitance, and the switch type and the channel number of the PCIE switch 3 are not specifically limited as long as the PCIE data may be transmitted at high speed. The controller 1 is connected to the PCIE switch 3, the PCIE switch 3 is connected to the GPU 2, and data is transmitted through the PCIE link. It should be noted that the number of the PCIE devices connected to the PCIE switch 3 is not specifically limited in the present disclosure, and can be set according to the actual situation, as long as the 100 MHZ homologous clock signal or the 100 MHz non-homologous clock signal are transmitted to the PCIE device to be used. The specific design of the PCIE link is the same as the PCIE link of the existing clock architecture, and is not specifically illustrated.

The FPGA 4 is connected to the PCIE switch 3 and the GPU 2, The FPGA 4 is configured to read the clock architecture modes supported by the PCIE switch 3 and the GPU 2, acquire corresponding 100 MHz clock signals according to the clock architecture modes, and fan out the clock signals to the PCIE switch 3 and the GPU 2 to be used. The clock architecture modes are the homologous mode and the non-homologous mode. The clock architecture modes supported by the PCIE switch 3 and the GPU 2 are read via a SMBUS link, and it is determined which clock architecture mode is required. For the required clock architecture mode, corresponding clock signal is acquired in the FPGA 4. The FPGA 4 receives the 100 MHz homologous and non-homologous clock signals sent by the first clock generator 5 and the second clock generator 6. When the homologous architecture mode is supported, only the 100 MHZ homologous clock signal of the related device is sent, and the signal sent by the second clock generator 6 is shielded or blocked. When the non-homologous architecture mode is supported, only the 100 MHZ non-homologous clock signal is sent, and the signal sent by the first clock generator 5 is shielded or blocked. When the PCIE switch 3 supports the homologous architecture mode and the GPU 2 supports the non-homologous architecture mode, it is necessary to receive and send two kinds of signals. How to choose signals to be blocked or shielded in the FPGA4 is not specifically defined in the present disclosure, and the signals may be chosen through methods such as disposing a switch or other codes, which is set according to the actual situation.

In addition, when the FPGA 4 receives the 100 MHz non-homologous clock signal, the 100 MHz homologous clock signal may be shielded by the FPGA 4. However, the first clock fan-out device 7 may continue to fan out the 100 MHz homologous clock signal and transmit the 100 MHZ homologous clock signal to the controller 1.

The present disclosure provides a clock architecture device for supporting a PCIE clock, including: a controller, a GPU, a PCIE switch, a FPGA, a first clock generator, a second clock generator, a first clock fan-out device and a second clock fan-out device: the first clock generator is connected to the first clock fan-out device, and is configured to generate a 100 MHz homologous clock signal: the first clock fan-out device is connected to the controller and the FPGA, and is configured to fan out 100 MHz homologous clock signals: the second clock generator is connected to the second clock fan-out device, and is configured to generate a 100 MHz non-homologous clock signal: the second clock fan-out device is connected to the FPGA, and is configured to fan out 100 MHz non-homologous clock signals: the controller is connected to the PCIE switch: the PCIE switch is connected to the GPU: the FPGA is connected to the PCIE switch and the GPU, and is configured to: read the clock architecture modes supported by the PCIE switch and the GPU, acquire corresponding 100 MHz clock signals according to the clock architecture modes, and fan out the 100 MHz clock signals to the PCIE switch and the GPU to be used, where the clock architecture modes are the homologous mode and the non-homologous mode. In the device, an architecture supporting the homologous and the non-homologous PCIE clock is achieved by one card, and it is not necessary to provide additional compatible devices. The clock architecture modes supported by the PCIE switch and the GPU are read. The FPGA receives the 100 MHz homologous clock signal and the 100 MHz non-homologous clock signal, selects a corresponding clock signal according to different clock architecture modes, so that PCIE devices with different clock modes are compatible, that is, the compatibility is improved. Moreover, the problem that a larger space of the main board is occupied caused by using two cards is avoided. Further, when the clock architecture mode supported by the GPU is different from the clock architecture modes supported by other accelerating devices, they may be adapted at the same time. The development cost for hardware connection and the equipment cost are saved.

Based on the embodiments stated above, the clock architecture further includes: a power supply 9.

The FPGA 4 is connected to the power supply 9, and transmits an enabling signal.

The power supply 9 is connected to the GPU 2 and the PCIE switch 3, and is configured to receive the enabling signal to supply power to the GPU 2 and the PCIE switch 3.

When the FPGA 4 chip fans out the 100 MHz clock signal to the PCIE switch and the GPU 2, the FPGA 4 transmits the enabling signal to the power supply 9, the controller 1 supplies power to the PCIE switch and the GPU 2. At the same time, as shown in FIG. 1, the FPGA 4 is connected to the GPU 2 and the PCIE switch 3 through the SMBUS link to read whether the GPU 2 and the PCIE switch 3 support the homologous mode or the non-homologous mode.

Enabling means that an entire module may work only when an input pin of a chip or an input port of a circuit is activated, for example, when it is placed at a high level. Enabling is responsible for the inputting and the outputting of the control signal. Enabling is popularly said to be an "allowable" signal. Feed enabling is a signal that is allowed to feed, that is, the motor may rotate when the feed enabling signal is effective.

The power supply 9 is connected to the GPU 2 and the PCIE switch 3, and is configured to receive the enabling signal. At the same time, the power supply 9) supplies power to the GPU2 and the PCIE switch 3. Specifically, the method of supplying power by the power supply 9 is not specifically illustrated. The power supply 9 may supply power to the GPU2 and the PCIE switch 3 through a pin of the GPU 2 or a pin of the PCIE switch 3.

The FPGA provided by the present disclosure is connected to the power supply, the power supply is connected to the GPU and the PCIE switch, and the enabling signal is sent, the power supply receives the enabling signal to supply power to the GPU and the PCIE switch. Therefore, the power consumption is saved.

The embodiments of the clock architecture supporting the PCIE clock provided by present disclosure are described in detail above. A method for supporting a PCIE clock corresponding to the device is further provided by present disclosure. Since method embodiments and the device embodiments correspond to each other, the method embodiments may be refer to the description of the device embodiments, which is not repeated here.

Figure 2:
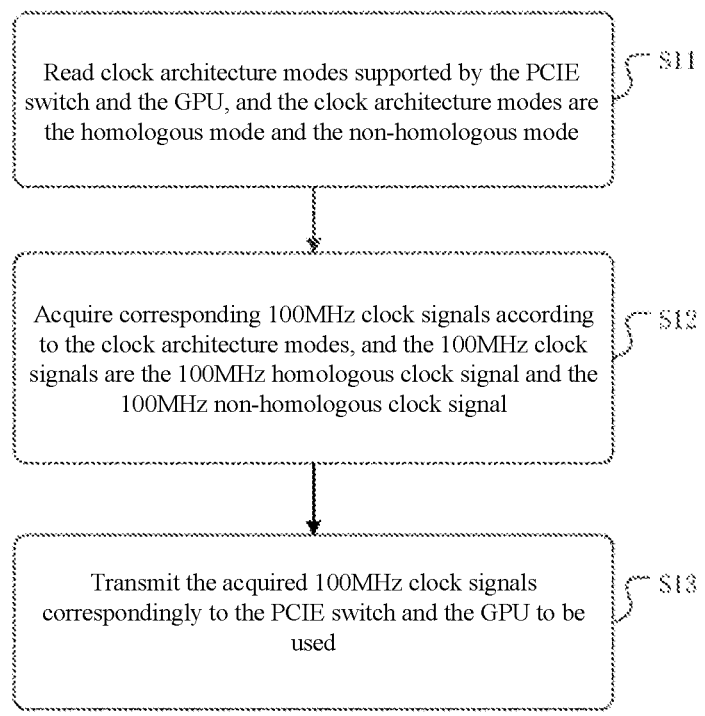
FIG. 2 is a flow chart of a method for supporting a PCIE clock according to one or more embodiments of the present disclosure.

FIG. 2 is a flow chart of a method for supporting a PCIE clock according to an embodiment of the present disclosure. As shown in FIG. 2, the method includes steps described below.

At S11, clock architecture modes supported by the PCIE switch and the GPU are read, and the clock architecture modes are the homologous mode and the non-homologous mode.

On the basis of the above embodiments, the FPGA is connected to the PCIE switch and the GPU, and receives information according to the clock architecture modes supported by the PCIE switch and the GPU. The clock architecture modes are mainly divided into two modes, that is, the homologous mode and the non-homogenous mode. In the homologous mode, the accelerating device supports the 100 MHz homologous clock signal, which is generated by the first clock generator at the controller side and fanned out by the first clock fan-out device. In the non-homologous mode, the accelerating device supports the 100 MHz non-homologous clock signal, which is generated by the second clock generator not located at the controller side and fanned out by the second clock fan-out device.

The reading method is to receive information about which kind of clock signal is needed for the current working information of the PCIE switch and the GPU. According to the clock architecture modes of the PCIE switch and the GPU under different working conditions customized by the motherboard manufacturer before leaving the factory, for example, the homologous mode is set to be (I2C) and the non-homologous mode is set to be 1, no matter whether it is the PCIE switch or the GPU, if the information corresponding to the PCIE switch received in the FPGA is 1, the clock architecture mode supported by the PCIE switch is the non-homologous mode, the same principle is applied to the GPU, which is not further described.

For the method that the FPGA reads the PCIE switch and the GPU, the reception may be performed according to the bus protocol generated by the hardwire connection, and may also be acquired in the program that records events such as work logs. In some embodiments, it is read through the bus protocol in the present disclosure, and the protocol may be the inter-integrated circuit (I2C) bus protocol, system management bus (SMBUS) protocol, etc., which is not specifically limited, as long as the information about the clock architecture modes supported by PCIE switch and the GPU may be received in real time.

At S12, corresponding 100 MHz clock signals are acquired according to the clock architecture modes, and the 100 MHz clock signals are the 100 MHz homologous clock signal and the 100 MHz non-homologous clock signal.

The FPGA acquires the corresponding 100 MHz clock signals according to the read clock architecture mode, and the corresponding 100 MHz clock signals are the 100 MHZ homologous clock signal and the 100 MHz non-homologous clock signal. The 100 MHz homologous clock signal is the clock signal generated by the first clock generator at the controller side and fanned out by the first clock fan-out device. The 100 MHz non-homologous clock signal is the clock signal generated by the second clock generator not located at the controller side and fanned out by the second clock fan-out device.

At S13, the acquired 100 MHz clock signals are correspondingly transmitted to the PCIE switch and the GPU to be used.

The acquired 100 MHZ clock signals are transmitted to the PCIE switch and the GPU, correspondingly. If both of the PCIE switch and the GPU support the homologous mode, the 100 MHz homologous clock signals are received. If both of the PCIE switch and the GPU support the non-homologous mode, the 100 MHz non-homologous clock signals are received. If the PCIE switch supports the homologous mode and the GPU supports the non-homologous mode, the 100 MHZ homologous clock signal and the 100 MHZ non-homologous clock signal are correspondingly received and transmitted.

According to the method for supporting the PCIE clock provided by the present disclosure, the clock architecture modes supported by the PCIE switch and the GPU are read, where the clock architecture modes are the homologous mode and the non-homologous mode: corresponding 100 MHz clock signals are acquired according to the clock architecture modes, where the 100 MHZ clock signals are the 100 MHz homologous clock signal and the 100 MHz non-homologous clock signal; and the acquired 100 MHz clock signals are correspondingly transmitted to the PCIE switch and the GPU to be used. In this method, the clock architecture modes supported by the PCIE switch and the GPU are read, the FPGA receives the 100 MHZ homologous clock signal and the 100 MHZ non-homologous clock signal. The corresponding clock signals are selected according to the different clock architecture modes, so that PCIE devices with different clock modes are compatible, that is, the compatibility is improved. Moreover, the problem that a larger space of the main board is occupied caused by using two cards is avoided. Further, when the clock architecture mode supported by the GPU is different from the clock architecture modes supported by other accelerating devices, they may be adapted. Therefore, the development cost for hardware connection and the equipment cost are saved.

Based on the embodiments stated above, step S12, in which corresponding 100 MHz clock signals are acquired according to the clock architecture modes, further includes:
    acquiring the 100 MHz homologous clock signals when the read clock architecture modes supported by the PCIE switch and the GPU are both the homologous mode;
    acquiring the 100 MHZ non-homologous clock signals when the read clock architecture modes supported by the PCIE switch and the GPU are both the non-homologous mode; and
    acquiring the 100 MHz homologous clock signal and the 100 MHz non-homologous clock signal when the read clock architecture mode supported by the PCIE switch is the homologous mode and the read clock architecture mode supported by the GPU is the non-homologous mode.

If it is determined that the read clock architecture modes supported by the PCIE switch and the GPU are both the homologous mode, based on the determination that the read clock architecture modes supported by the PCIE switch and the GPU are both the homologous mode, the 100 MHz homologous clock signals are obtained. If it is determined that the read clock architecture modes supported by the PCIE switch and the GPU are both the non-homologous mode, based on the determination that the read clock architecture modes supported by the PCIE switch and the GPU are both the non-homologous mode, the 100 MHz non-homologous clock signals are obtained. If it is determined that the read clock architecture mode supported by the PCIE switch is the homologous mode and the read clock architecture mode supported by the GPU is the non-homologous mode, based on the determination that the read clock architecture mode supported by the PCIE switch is the homologous mode and the read clock architecture mode supported by the GPU is the non-homologous mode, the 100 MHz homologous clock signal and the 100 MHz non-homologous clock signal are acquired.

It should be noted that when the clock architecture modes supported by the PCIE switch and the GPU are both the homologous mode, the FPGA controls the internal multi-channel data selector (Mux), the first clock generator is controlled to fan out two 100 MHz homologous clock signals to the PCIE switch and the GPU through the first clock fan-out device: when the clock architecture modes supported by the PCIE switch and the GPU are both the non-homologous mode, the second clock generator is controlled to fan out two 100 MHz non-homologous clock signals to the PCIE switch and the GPU through the second clock fan-out device: when the clock architecture mode supported by the PCIE switch is the homologous mode and the clock architecture mode supported by the GPU is the non-homologous mode, the first clock generator is controlled to fan out a 100 MHz homologous clock signal to the PCIE switch through the first clock fan-out device, and the second clock generator is controlled to fan out a 100 MHz non-homologous clock signal to the GPU through the second clock fan-out device.

Since the PCIE switch is connected to the controller and the GPU, the non-homologous clock signal of the PCIE switch under the non-homologous mode is mutually exclusive with the homologous clock signal of the controller. Therefore, the case that the clock architecture mode supported by the PCIE switch is the non-homologous mode and the clock architecture mode supported by the GPU is the homologous mode does not exist.

In addition, the Mux synchronizers restrict one-way data transmission across clock domains, that is, data can only be transmitted from the source clock domain to the destination clock domain, and can not be transmitted from the destination clock domain to the source clock domain, which requires the data to be synchronized to follow an enabling signal.

The acquiring corresponding 100 MHz clock signals according to the clock architecture modes provided by the present disclosure includes acquiring the corresponding 100 MHZ clock signals for three clock architecture modes, the compatibility of the clock architecture modes is improved.

Based on the embodiments stated above, step S11, in which clock architecture modes supported by the PCIE switch and the GPU are read, further includes:
    reading the clock architecture modes supported by the PCIE switch and the GPU via a SMBUS link.

The FPGA is connected to the PCIE switch and the GPU, and receives information according to the clock architecture modes supported by the PCIE switch and the GPU, the reading mode is read by the FPGA according to the bus protocol generated by the hardwire connection. The bus protocol may be the I2C protocol, the SMBUS protocol, and the SMBUS protocol is based on the I2C protocol. A control bus is provided for the system and the power supply management tasks. Messages are sent and received between devices through the SMBUS, rather than using a separate control line, the quantity of pins of the device is saved, and is a subset of the I2C protocol.

Compared with the I2C protocol, the SMBUS protocol has strict requirements: the minimum value of the clock frequency is 10 KHz; the maximum time value of the clock stretching is also limited; the SMBUS protocol compulsively requires an I2C device to send a response signal after the I2C device receives its own device address, to let the other party know the status of the device and clarify the transmission format of the data. The I2C protocol only defines how to transmit the data, without defining the format of the data, and the format of the data is completely defined by the device. Therefore, it is an optional implementation in the present embodiment to obtain the clock architecture modes supported by the PCIE switch and the GPU via the SMBUS link.

The acquiring the clock architecture modes supported by the PCIE switch and the GPU via the SMBUS link provided by the present disclosure, only involves acquiring the data transmission of the clock architecture mode, rather than receiving all the signals of the PCIE switch and the GPU in a broad way. Therefore, it is more targeted for the format of the data transmission.

The requirements for the clock signals in the timing sequence design are very strict. All timing sequence calculations are based on a constant clock signal. However, in practice, the clock signal is not always so perfect, and the problems of jitter and offset may occur. The jitter is the difference between two clock cycles. This error is generated inside the clock generator, and is related to the crystal oscillator or the internal circuit of the phase-locked loop (PLL). The offset is a delay difference between multiple sub-clock signals generated by the same clock. The manifestation of the offset includes the offset between multiple outputs of the clock driver, as well as the offset between the clock signal of the receiving end and the clock signal of the driving end caused by the printed circuit board (PCB) wiring error.

In some specific server product design, when the chassis size is larger, the cable is longer or the 100 MHz clock wiring in the board is longer or there are other differences that interfere with the 100 MHz clock, the two 100 MHz clock signals received by the FGPA have a larger phase difference. Therefore, in the embodiments stated above, the method further includes:
  performing a testing on testing signals for the 100 MHz homologous clock signal and the 100 MHz non-homologous clock signal after acquiring a loopback board; and
  acquiring a phase difference according to the testing signals and the practical signals, and performing compensation to suppress the phase difference, wherein the practical signals are the 100 MHz clock signal actually transmitted to the PCIE switch and the GPU.

After the loopback test, the phase difference from the first clock fan-out device to the FPGA is tested. Simultaneously, the phase difference from the second clock fan-out device to the FPGA is also tested. The phase difference includes both deterministic jitter and random jitter. The deterministic jitter results from deterministic factors such as clock wiring. In most cases, the random jitter is caused by factors such as a heat difference.

According to the tested phase difference, the phase of the clock actually reaching the first clock fan-out device and the second clock fan-out device is compensated in the FPGA code. For example, the phase difference is 90°, then 270° is compensated. It should be noted that the phase difference may be compensated according to a correction algorithm of the harmonic analysis method in the form of windowing, and may also be completed according to the fast fitting algorithm of the clock signal, which is not specific required by the present disclosure, as long as the phase difference of the clock signal received by the PCIE device is eliminated.

Through the correction compensation for the phase difference of the 100 MHZ clock signal mentioned in the present disclosure, the phase difference of the clock signals received by the PCIE device is eliminated, the synchronous clock test function is realized, the failure rate of the whole system is reduced and the reliability of the system is improved.

Based on the embodiments stated above, reading the clock architecture modes supported by the PCIE switch and the GPU in step S11 includes:
  reading the clock architecture modes supported by the PCIE switch and the GPU when the PCIE switch and the GPU are powered on successfully.

The FPGA loads codes from an internal flash memory (UFM) available for the user and runs the codes, and the FPGA sends an enabling signal to control the PCIE switch and the GPU to be powered on. When the PCIE switch and the GPU are powered on successfully, the clock architecture modes supported by the PCIE switch and the GPU are read. If the PCIE switch and the GPU fail to be powered on, it means that the connecting mode of the hardware or the electronic components of the hardware per se are damaged, then the execution process is directly exited, the homologous clock architecture mode and the non-homologous clock architecture mode that support the PCIE devices are not performed.

According to the present disclosure, when the PCIE switch and the GPU are powered on successfully, the clock architecture modes supported by the PCIE switch and the GPU are read. The FPGA runs from the UFM module, thus the external component resources are saved. The FPGA controls the enabling signal so that the PCIE switch and the GPU are powered on, ensuring that the clock architecture modes supported by the PCIE switch and the GPU are read correctly.

Figure 3:
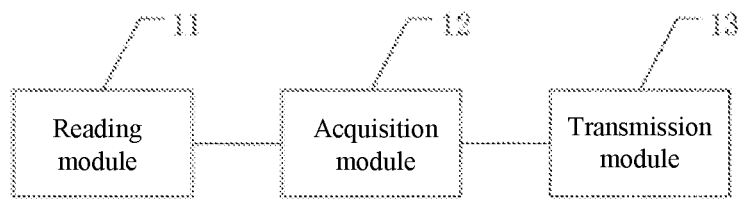
FIG. 3 is a structural diagram of another clock architecture supporting a PCIE clock according to one or more embodiments of the present disclosure.

The embodiments corresponding to the method for supporting the PCIE clock are described in detail above. On this basis, the present disclosure further provides a clock architecture supporting the PCIE clock corresponding to the above methods. FIG. 3 is a structural diagram of another clock architecture supporting a PCIE clock according to an embodiment of the present disclosure. As shown in FIG. 3, the clock architecture supporting the PCIE clock includes:
  a reading module 11, configured to read clock architecture modes supported by the PCIE switch and the GPU, and the clock architecture modes are the homologous mode and the non-homologous mode;
  an acquisition module 12, configured to acquire corresponding 100 MHZ clock signals according to the clock architecture modes, and the 100 MHZ clock signals are the 100 MHZ homologous clock signal and the 100 MHz non-homologous clock signal; and
  a transmission module 13, configured to correspondingly transmit the acquired 100 MHZ clock signals to the PCIE switch and the GPU to be used.

Since the apparatus embodiments and the embodiments stated above correspond to each other, the apparatus embodiments may refer to the embodiments of the part of the device, which is not repeated here.

According to the clock architecture supporting the PCIE clock provided by the present disclosure, the clock architecture modes supported by the PCIE switch and the GPU are read, and the clock architecture modes are the homologous mode and the non-homologous mode; corresponding 100 MHz clock signals are acquired according to the clock architecture modes, and the 100 MHZ clock signals are the 100 MHZ homologous clock signal and the 100 MHZ non-homologous clock signal; and the acquired 100 MHz clock signals are correspondingly transmitted to the PCIE switch and the GPU to be used. The clock architecture modes supported by the PCIE switch and the GPU are read, the FPGA receives the 100 MHZ homologous clock signal and the 100 MHz non-homologous clock signal. The corresponding clock signals are selected according to different clock architecture modes, so that PCIE devices with different clock modes are compatible, that is, the compatibility is improved. Moreover, the problem that a larger space of the main board is occupied caused by using two cards is avoided. Further, when the clock architecture mode supported by the GPU is different from the clock architecture modes supported by other accelerating devices, they may be adapted at the same time. The development cost for hardware connection and the equipment cost are saved.

Figure 4:
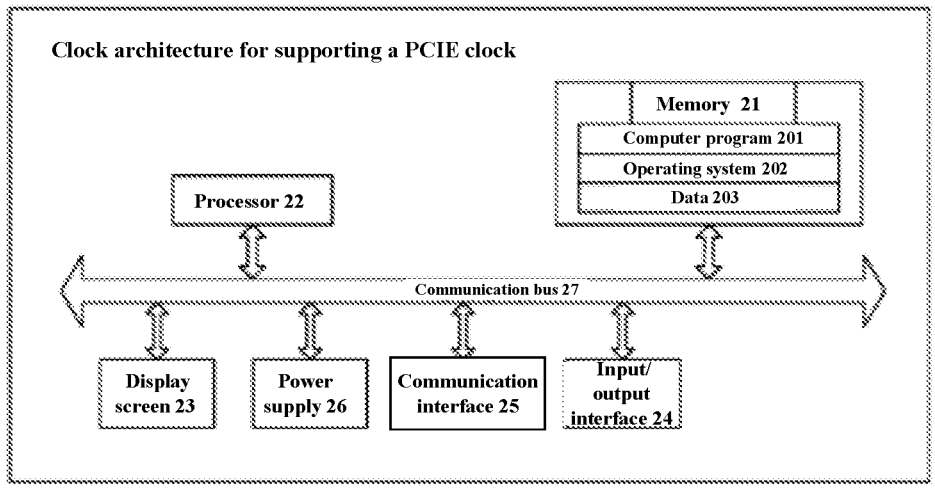
FIG. 4 is a structural diagram of yet another clock architecture supporting a PCIE clock according to one or more embodiments of the present disclosure.

Reference is made to FIG. 4, which is a structural diagram of another clock architecture supporting a PCIE clock according to an embodiment of the present disclosure. As shown in FIG. 4, the clock architecture supporting the PCIE clock includes:

a memory 21 for storing computer-readable instructions;
one or more processors 22, configured to implement the steps of the method for supporting the PCIE clock when the computer-readable instructions are executed by the one or more processors.

The clock architecture supporting the PCIE clock provided by the present embodiment may include, but is not limited to, smartphones, tablets, laptops, or desktops and so on.

The processor 22 may include one or more processing cores, such as 4-core processors. 8-core processors, etc. The processor 22 may be implemented in at least one hardware form of digital signal processing (DSP). FPGA, and programmable logic array (PLA). The processor 22 may also include a master processor and a coprocessor. The master processor is a processor for processing the data in a wake-up state, also known as CPU; the coprocessor is a low-power processor for processing the data in a standby state. In some embodiments, the processor 22 may be integrated with the GPU, the GPU is responsible for rendering and drawing the content that the display screen needs to display. In some embodiments, the processor 22 may also include an artificial intelligence (AI) processor that is used to handle computational operations related to machine learning.

The memory 21 may include one or more computer readable storage media, the computer readable storage media may be non-transient. The memory 21 may also include a high-speed random access memory, and a non-volatile memory, such as one or more disk storage devices and flash storage devices. In the present embodiment, the memory 21 is used to store at least the following computer-readable instruction 201, after the computer-readable instruction is loaded and executed by the processor 22, the relevant steps of the method for supporting the PCIE clock disclosed in any one of the above embodiments may be implemented. In addition, the resources stored in the memory 21 may also include an operating system 202 and data 203, and the storage method may be transient storage or permanent storage. The operating system 202 may include Windows, Unix, Linux, etc. The data 203 may include but not be limited to the data involved in the method for supporting the PCIE clock, and so on.

In some embodiments, the clock architecture supporting the PCIE clock may also include a display screen 23, an input and output interface 24, a communication interface 25, a power supply 26 and a communication bus 27.

Those skilled in the art may understand that FIG. 4 is a structural diagram of another clock architecture supporting a PCIE clock provided by an embodiment of the present disclosure. The structure shown in FIG. 4 does not constitute a limit to the clock architecture supporting the PCIE clock, and the clock architecture may include more or less components than the structure shown in the diagram.

The processor 22 implements the method for supporting the PCIE clock provided by any one of the embodiments stated above by calling the instructions stored in the memory 21.

According to the method for supporting the PCIE clock provided by the present disclosure, the clock architecture modes supported by the PCIE switch and the GPU are read, and the clock architecture modes are the homologous mode and the non-homologous mode; the corresponding 100 MHz clock signals are acquired according to the clock architecture modes, and the 100 MHZ clock signals are the homologous 100 MHz clock signal and the 100 MHz non-homologous clock signal; and the acquired 100 MHz clock signals are correspondingly transmitted to the PCIE switch and the GPU to be used. The clock architecture modes supported by the PCIE switch and the GPU are read. The FPGA receives the 100 MHz homologous clock signal and the 100 MHZ non-homologous clock signal, and selects the corresponding clock signals according to the different clock architecture modes, so that the PCIE devices with different clock modes are compatible, that is, the compatibility is improved. The problem that a larger space of the main board is occupied caused by using two cards is avoided. Moreover, the following problem is also solved; when the clock architecture mode supported by the GPU is different from the clock architecture modes supported by other accelerating devices, they may be adapted. The development cost for hardware connection and the equipment cost are saved.

Figure 5:
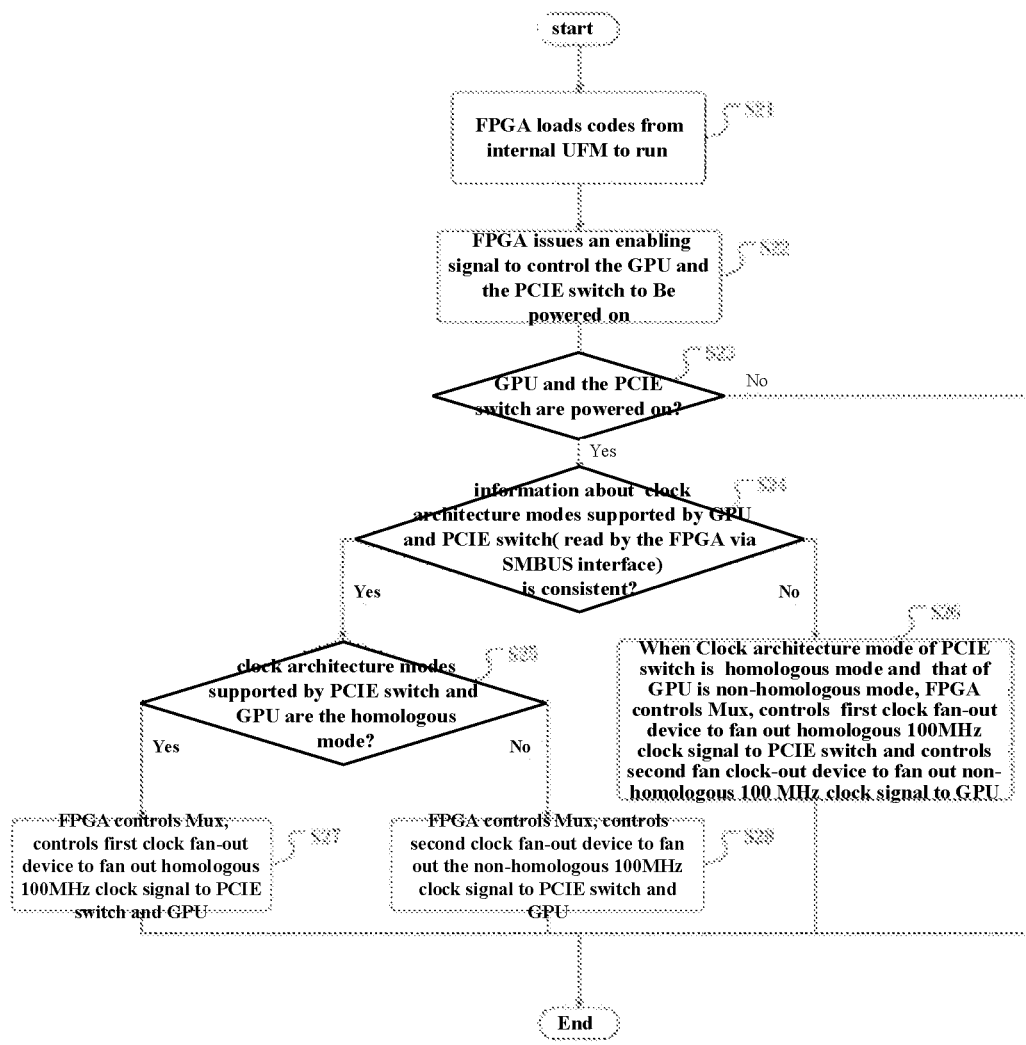
FIG. 5 is a flow chart of another method for supporting a PCIE clock according to one or more embodiments of the present disclosure.

Combining the embodiments stated above, FIG. 5 is a flow chart of another method for supporting a PCIE clock provided by an embodiment of the present disclosure. As shown in FIG. 5, the method includes:

At S21, the FPGA loads codes from the internal UFM, and runs the codes;
At S22, the FPGA issues an enabling signal to control the GPU and the PCIE switch to be powered on;
At S23, it is determined whether the GPU and the PCIE switch are powered on, if yes, the method proceeds to step S24, if no, the method ends;
At S24, it is determined whether the information about the supported clock architecture modes read by the FPGA from the GPU and the PCIE switch through the SMBUS interface is consistent; if yes, the method proceeds to step S25; if no, the method proceeds to step S26;
At S25, it is determined whether the read clock architecture modes supported by the PCIE switch and the GPU are both the homologous mode, if yes, the method proceeds to step S27, if no, the method proceeds to step S28;
At S27, the FPGA controls the Mux, and controls the first clock fan-out device to fan out the 100 MHz homologous clock signals to the PCIE switch and the GPU;
At S28, the FPGA controls the Mux. and controls the second clock fan-out device to fan out the 100 MHz non-homologous clock signals to the PCIE switch and the GPU.
At S26, when the read clock architecture mode of the PCIE switch is the homologous mode and the read clock architecture mode of the GPU is the non-homologous mode, the FPGA controls the Mux, controls the first clock fan-out device to fan out the 100 MHz homologous clock signal to the PCIE switch, and controls the second fan clock-out device to fan out the non-homologous 100 MHz clock signal to the GPU.

The flow chart of another method for supporting the PCIE clock provided by embodiments of the present disclosure is introduced above, which has the same beneficial effect as the method for supporting the PCIE clock mentioned above.

Further, the present disclosure further provides one or more non-volatile computer-readable storage mediums storing computer-readable instructions that, when executed by one or more processors, cause the one or more processors to implement the steps of the method for supporting the PCIE clock provided by the embodiments stated above.

It may be understood that if the method in the above embodiments is implemented in the form of a software functional unit and sold or used as an independent product, it may be stored in a computer-readable storage medium. Based on such understanding, the technical solution of the present disclosure, in essence, or the part that contributes to the related art, or all or a part of this technical solution, may be embodied in a form of a software product. This computer software product is stored in a storage medium and performs all or a part of the steps of the methods described in the embodiments of the present disclosure. The aforementioned storage medium includes: a USB flash drive, a removable hard disk, a read-only memory (ROM), a random access memory (RAM), a magnetic disk or an optical disk, and other media which may store program codes.

For the introduction to a computer-readable storage medium provided in the present disclosure, it may refer to the above method embodiments, which will not be repeated here and has the same beneficial effects as the method for supporting the PCIE clock as described above.

The clock architecture and method for supporting the PCIE clock, and the medium provided by the present disclosure above are described above in detail. In this specification, various embodiments are described progressively, with each embodiment focusing on differences from the other embodiments, and similar or identical parts between the embodiments may be cross-referenced. For the device disclosed in the embodiments, since it corresponds to the method disclosed in the embodiments, it is described in a simple manner, that is, reference may be made to the illustration of the part of the method. It should be pointed out that for those skilled in the art, without deviating from the principle of the present disclosure, several improvements and modifications may be made to the present disclosure. These improvements and modifications also fall within the scope of protection of the claims of the present disclosure.

It should also be noted that the relational terms such as "first" and "second" in the specification are merely used to distinguish one entity or operation from another entity or operation without necessarily requiring or implying any actual relationship or order between such entities or operations. Furthermore, the terms like "include", "comprise", or any other variations thereof, are intended to indicate a non-exclusive inclusion, such that a process, a method, an article, or an apparatus that includes a series of elements does not only include those elements but further include other elements that are not expressly listed or inherent to such process, method, article, or apparatus. Without further constraints, an element defined by a phrase like "includes a . . ." does not preclude the existence of additional identical elements in the process, the method, the article, or the apparatus that includes the element.

The invention claimed is:

1. A clock architecture supporting a PCIE clock, comprising: a controller, a graphics processing unit (GPU), a programmable communication interface extension (PCIE) switch, a field-programmable gate array (FPGA), a first clock generator, a second clock generator, a first clock fan-out device and a second clock fan-out device;
    wherein the first clock generator is connected to the first clock fan-out device, and is configured to generate a 100 MHz homologous clock signal; the first clock fan-out device is connected to the controller and the FPGA, and is configured to fan out the 100 MHz homologous clock signal; and
    the second clock generator is connected to the second clock fan-out device, and is configured to generate a 100 MHz non-homologous clock signal; the second clock fan-out device is connected to the FPGA, and is configured to fan out the 100 MHz non-homologous clock signal; the controller is connected to the PCIE switch, the PCIE switch is connected to the GPU;
    the FPGA is connected to the PCIE switch and the GPU, and is configured to read clock architecture modes supported by the PCIE switch and the GPU, acquire corresponding 100 MHz clock signals according to the clock architecture modes, and fan out the acquired 100 MHz clock signals to the PCIE switch and the GPU to be used, wherein the clock architecture modes are a homologous mode and a non-homologous mode;
    wherein the FPGA is further configured to:
        acquire the 100 MHz homologous clock signals when the read clock architecture modes supported by the PCIE switch and the GPU are both the homologous mode;
        acquire the 100 MHz non-homologous clock signals when the read clock architecture modes supported by the PCIE switch and the GPU are both the non-homologous mode; and
        acquire the 100 MHz homologous clock signal and the 100 MHz non-homologous clock signal when the read clock architecture mode supported by the PCIE switch is the homologous mode and the read clock architecture mode supported by the GPU is the non-homologous mode.

2. The clock architecture supporting the PCIE clock according to claim 1, further comprising a power supply;
    wherein the FPGA is connected to the power supply, and is configured to transmit an enabling signal; and
    the power supply is connected to the GPU and the PCIE switch, and is configured to receive the enabling signal to supply power to the GPU and the PCIE switch.

3. The clock architecture supporting the PCIE clock according to claim 2, wherein the power supply is configured to supply power to the GPU and the PCIE switch through a pin of the GPU or a pin of the PCIE switch.

4. A method for supporting a PCIE clock, applied to the clock architecture supporting the PCIE clock according to claim 1, comprising:
    reading the clock architecture modes supported by the PCIE switch and the GPU, wherein the clock architecture modes are the homologous mode and the non-homologous mode;
    acquiring corresponding 100 MHz clock signals according to the clock architecture modes, wherein the 100 MHz clock signals are the 100 MHz homologous clock signal and the 100 MHz non-homologous clock signal; and
    transmitting the acquired 100 MHz clock signals correspondingly to the PCIE switch and the GPU to be used;

wherein the acquiring corresponding 100 MHz clock signals according to the clock architecture modes comprises:
acquiring the 100 MHz homologous clock signals when the read clock architecture modes supported by the PCIE switch and the GPU are both the homologous mode;
acquiring the 100 MHz non-homologous clock signals when the read clock architecture modes supported by the PCIE switch and the GPU are both the non-homologous mode; and
acquiring the 100 MHz homologous clock signal and the 100 MHz non-homologous clock signal when the read clock architecture mode supported by the PCIE switch is the homologous mode and the read clock architecture mode supported by the GPU is the non-homologous mode.

5. The method for supporting the PCIE clock according to claim 4, wherein the reading the clock architecture modes supported by the PCIE switch and the GPU comprises:
reading the clock architecture modes supported by the PCIE switch and the GPU via a system management bus (SMBUS) link.

6. The method for supporting the PCIE clock according to claim 4, further comprising:
performing a test on testing signals for the 100 MHz homologous clock signal and the 100 MHz non-homologous clock signal after acquiring a loopback board; and
performing, according to a phase difference obtained from the testing signals and practical signals, compensation to suppress the phase difference, wherein the practical signals are the 100 MHz clock signals actually transmitted to the PCIE switch and the GPU.

7. The method for supporting the PCIE clock according to claim 6, wherein the phase difference comprises both deterministic jitter and random jitter.

8. The method for supporting the PCIE clock according to claim 7, wherein the phase difference is compensated according to a correction algorithm of the harmonic analysis method in the form of windowing.

9. The method for supporting the PCIE clock according to claim 4, wherein the reading the clock architecture modes supported by the PCIE switch and the GPU comprises:
reading the clock architecture modes supported by the PCIE switch and the GPU when the PCIE switch and the GPU are powered on successfully.

10. The method for supporting the PCIE clock according to claim 4, wherein the controller is connected to the PCIE switch, the PCIE switch is connected to the GPU, and data communication between the controller and the PCIE switch as well as between the PCIE switch and the GPU is achieved through a PCIE link.

11. The method for supporting the PCIE clock according to claim 4, wherein the power supply is configured to supply power to the GPU and the PCIE switch through a pin of the GPU or a pin of the PCIE switch.

12. The clock architecture supporting the PCIE clock according to claim 1, wherein the FPGA is further configured to:
read the clock architecture modes supported by the PCIE switch and the GPU via a system management bus (SMBUS) link.

13. The clock architecture supporting the PCIE clock according to claim 1, wherein the controller is connected to the PCIE switch, the PCIE switch is connected to the GPU, and data communication between the controller and the PCIE switch as well as between the PCIE switch and the GPU is achieved through a PCIE link.

14. A clock architecture supporting a PCIE clock, comprising a memory and one or more processors, wherein the memory is stored with computer-readable instructions that, when executed by the one or more processors, cause the one or more processors to implement operations of:
reading clock architecture modes supported by a programmable communication interface extension (PCIE) switch and a graphics processing unit (GPU), wherein the clock architecture modes are a homologous mode and a non-homologous mode;
acquiring corresponding 100 MHz clock signals according to the clock architecture modes, wherein the 100 MHz clock signals are the 100 MHz homologous clock signal and the 100 MHz non-homologous clock signal; and
transmitting the acquired 100 MHz clock signals correspondingly to the PCIE switch and the GPU to be used;
wherein the one or more processors is further configured to implement operations of:
acquiring the 100 MHz homologous clock signals when the read clock architecture modes supported by the PCIE switch and the GPU are both the homologous mode;
acquiring the 100 MHz non-homologous clock signals when the read clock architecture modes supported by the PCIE switch and the GPU are both the non-homologous mode; and
acquiring the 100 MHz homologous clock signal and the 100 MHz non-homologous clock signal when the read clock architecture mode supported by the PCIE switch is the homologous mode and the read clock architecture mode supported by the GPU is the non-homologous mode.

15. The clock architecture supporting a PCIE clock according to claim 14, wherein the one or more processors is further configured to implement operations of:
reading the clock architecture modes supported by the PCIE switch and the GPU via a system management bus (SMBUS) link.

16. The clock architecture supporting a PCIE clock according to claim 14, wherein the one or more processors is further configured to implement operations of:
performing a test on testing signals for the 100 MHz homologous clock signal and the 100 MHz non-homologous clock signal after acquiring a loopback board; and
performing, according to a phase difference obtained from the testing signals and practical signals, compensation to suppress the phase difference, wherein the practical signals are the 100 MHz clock signals actually transmitted to the PCIE switch and the GPU.

17. A non-transitory computer-readable storage medium storing computer-readable instructions, wherein the computer-readable instructions, when executed by one or more processors, cause the one or more processors to implement operations of:
reading clock architecture modes supported by a programmable communication interface extension (PCIE) switch and a graphics processing unit (GPU), wherein the clock architecture modes are a homologous mode and a non-homologous mode;
acquiring corresponding 100 MHz clock signals according to the clock architecture modes, wherein the 100

MHz clock signals are the 100 MHz homologous clock signal and the 100 MHz non-homologous clock signal; and transmitting the acquired 100 MHz clock signals correspondingly to the PCIE switch and the GPU to be used;

wherein the one or more processors is further configured to implement operations of:

acquiring the 100 MHz homologous clock signals when the read clock architecture modes supported by the PCIE switch and the GPU are both the homologous mode;

acquiring the 100 MHz non-homologous clock signals when the read clock architecture modes supported by the PCIE switch and the GPU are both the non-homologous mode; and acquiring the 100 MHz homologous clock signal and the 100 MHz non-homologous clock signal when the read clock architecture mode supported by the PCIE switch is the homologous mode and the read clock architecture mode supported by the GPU is the non-homologous mode.

* * * * *